July 15, 1941.   L. A. HOLMES ET AL   2,248,992
OIL PRECLEANER
Filed Jan. 10, 1939
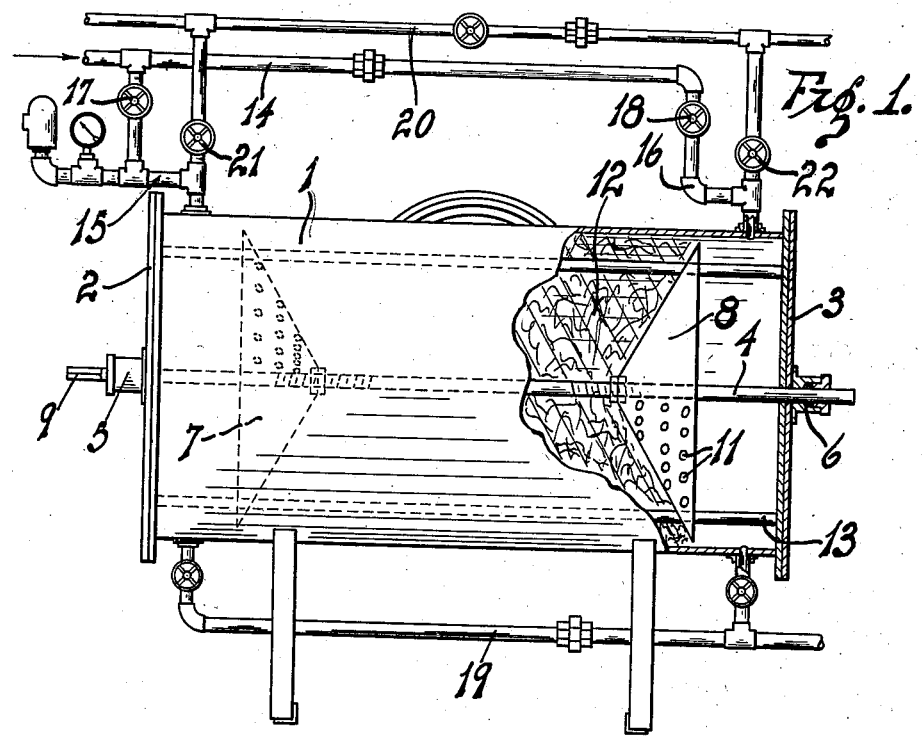
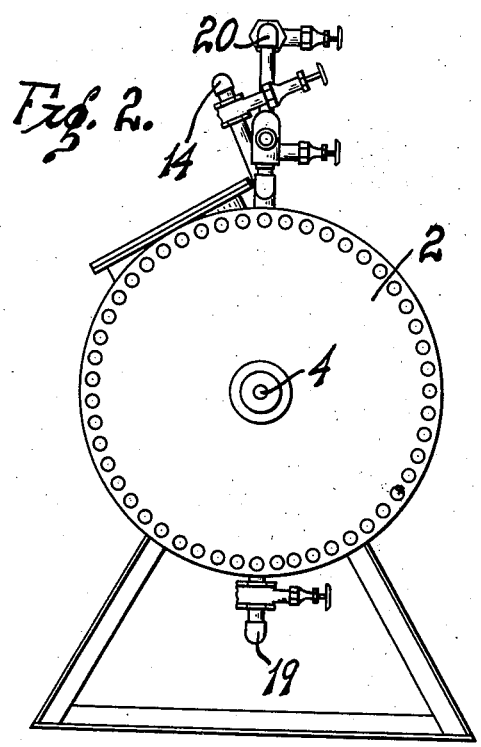
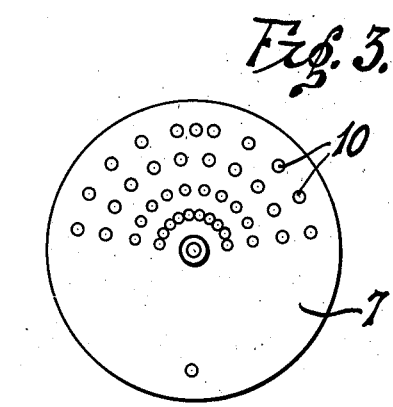
INVENTORS.
LAWRENCE A. HOLMES.
CLAUD H. BILLS.
BY
ATTORNEY.

Patented July 15, 1941

2,248,992

UNITED STATES PATENT OFFICE 2,248,992

OIL PRECLEANER

Lawrence A. Holmes, Whittier, and Claud H. Bills, Los Angeles, Calif.

Application January 10, 1939, Serial No. 250,112

3 Claims. (Cl. 210—138)

Our invention relates to a novel oil pre-cleaner, in which some of the detrimental ingredients of crude oil are removed so that this oil can be subsequently treated in a dehydrator to effectively clean the oil and bring it to a substantially pure state. Our pre-cleaner removes material such as sand and wax, as well as a portion of the water which might be mixed with the petroleum.

An object of our invention is to provide a novel oil pre-cleaner through which large quantities of oil may pass, and which will effectively remove all or a substantial part of certain detrimental materials in the oil.

Another object of our invention is to provide in an oil pre-cleaner a novel means of holding the cleaner or filter pack within a drum, so that the oil is compelled to pass through the body of the filter pack.

Another object is to provide a novel oil pre-cleaner of the character stated, in which the filter pack can be forced outwardly against the walls of the drum by means of a simple external adjustment.

Another object of our invention is to provide a novel oil pre-cleaner of the character stated, in which the oil can be caused to flow through the cleaner in either one of two directions, and also a cleaning fluid can be passed through the cleaner in any one of two directions.

Other objects, advantages and features of invention may appear from the accompanying drawing, the subjoined detailed description and the appended claims.

In the drawing:

Figure 1 is a side elevation of our oil pre-cleaner, with parts broken away to show interior construction.

Figure 2 is an end view of our pre-cleaner.

Figure 3 is a side elevation of one of the packing cones.

Referring more particularly to the drawing, the numeral 1 indicates a drum, which is preferably cylindrical, and is placed horizontally. The ends of the drum are closed by the heads 2 and 3. A shaft 4 extends axially through the drum 1, and packing boxes 5 and 6 on the heads 2 and 3, respectively, surround the shaft 4 and prevent leakage of material around the shaft. A pair of cones 7 and 8 are mounted on the shaft 4 in spaced relation substantially as shown in Figure 1. The shaft 4 is threaded through the cones 7 and 8, one thread being left handed, and the other right handed, so that rotation of the shaft will cause the cones to be moved toward or away from each other, depending on the direction of rotation of the shaft. The end of the shaft is squared, as shown at 9, to receive a suitable wrench, so that this shaft can be easily rotated by the operator.

The cone 7 is perforated throughout its upper surface, as shown at 10, and the cone 8 is perforated throughout its lower surface, as shown at 11. The purpose of this arrangement of perforations in the cones is to compel the oil to pass through the center or main body of the filter pack 12. The filter pack consists of a shredded or strand-like material, such as hay, straw, wood shavings, or the like. The cones 7—8 are slidably mounted on guide rods 13 so that these cones will not rotate with the shaft 4, and will, therefore, be adjusted as previously described. The apex of the cones 7 and 8 are directed inwardly, and, therefore, as these cones are drawn towards each other, the filter pack 12 will be compressed and will also be forced outwardly and tightly pressed against the inner surface of the drum or shell 1. Thus, the oil is prevented from passing around the filter pack adjacent the inner wall of the shell 1.

Oil is fed into the pre-cleaner through the pipe 14, one lead 15 of which extends into one end of the drum 1, and the other lead 16 extends into the opposite end of the drum. The leads 15 and 16 are tapped into the top of the shell so that the oil flows downwardly by gravity. It will be evident that oil can be directed into either end of the drum 1 by adjusting the valves 17—18. Oil is withdrawn from either end of the drum 1 through the pipe 19, and it is understood that oil is withdrawn from the opposite end of the drum from which the oil enters.

For the purpose of cleaning the inside of the drum 1, we provide a cleaner pipe 20, which extends into each end of the drum 1 through the same or adjacent fittings through which the incoming oil is fed. By adjusting the valves 21—22, wash fluid can be forced through the drum 1 in both directions.

Having described our invention, we claim:

1. An oil pre-cleaner comprising a drum, a filter pack within the drum, a cone bearing against each side of the filter pack, a shaft extending through the drum and threaded into each of the cones, said shaft having left hand threads on one end and right hand threads on the other end, rotation of said shaft being adapted to move said cones towards and away from each other, means engaging the cones whereby they are non-rotatably held in the drum, oil intake means extending into the drum, oil outlet means extending from the drum, one of said cones being perforated throughout its upper surface and the other cone being perforated throughout its lower surface.

2. An oil precleaner comprising a drum, a filter pack within the drum, a cone bearing against each side of the filter pack, each of said cones having holes therein through which oil passes in traversing the filter pack, a shaft extending through the drum and journaled in said drum, said shaft being threaded into each of the cones, said shaft having left hand threads on one end thereof and right hand threads on the other end, rotation of said shaft being adapted to move said cones toward and away from each other, a guide rod fixedly mounted in the drum and extending longitudinally thereof, said rod extending through the cones whereby said cones are non-rotatably held in the drum, oil intake means extending into the drum and oil outlet means extending from the drum.

3. An oil precleaner comprising a drum, a filter pack within the drum, a cone bearing against each side of the filter pack, a shaft extending through the drum and journaled in said drum, said shaft being threaded into each of the cones, said shaft having left hand threads on one end thereof and right hand threads on the other end, rotation of said shaft being adapted to move said cones toward and away from each other, a guide rod fixedly mounted in the drum and extending longitudinally thereof, said rod extending through the cones whereby said cones are non-rotatably held in the drum, oil intake means extending into the drum and oil outlet means extending from the drum, one of said cones being perforated throughout its upper surface, and the other cone being perforated throughout its lower surface.

LAWRENCE A. HOLMES.
CLAUD H. BILLS.